US012617246B2

(12) United States Patent
Herzog et al.

(10) Patent No.: US 12,617,246 B2
(45) Date of Patent: May 5, 2026

(54) ADAPTIVE KNOB CONTROL BASED UPON TRAILER MANEUVER TYPES

(71) Applicant: AUMOVIO Autonomous Mobility US, LLC, Auburn Hills, MI (US)

(72) Inventors: Brandon Herzog, Waterford, MI (US); Daniel Diessner, Rochester Hills, MI (US)

(73) Assignee: AUMOVIO Autonomous Mobility US, LLC, Auburn Hills, MI (US)

( * ) Notice: Subject to any disclaimer, the term of this patent is extended or adjusted under 35 U.S.C. 154(b) by 263 days.

(21) Appl. No.: 18/261,428

(22) PCT Filed: Jan. 13, 2022

(86) PCT No.: PCT/US2022/070172
§ 371 (c)(1),
(2) Date: Jul. 13, 2023

(87) PCT Pub. No.: WO2022/155657
PCT Pub. Date: Jul. 22, 2022

(65) Prior Publication Data
US 2024/0067268 A1    Feb. 29, 2024

Related U.S. Application Data

(60) Provisional application No. 63/199,632, filed on Jan. 13, 2021.

(51) Int. Cl.
*B60D 1/24* (2006.01)
*B60W 50/08* (2020.01)
(Continued)

(52) U.S. Cl.
CPC .......... *B60D 1/245* (2013.01); *B60W 50/085* (2013.01); *B60W 50/10* (2013.01); *B60W 50/14* (2013.01);
(Continued)

(58) Field of Classification Search
None
See application file for complete search history.

(56) References Cited

U.S. PATENT DOCUMENTS 9,506,774 B2 * 11/2016 Shutko ..................... B60R 1/27
9,540,043 B2    1/2017 Lavoie
(Continued)

FOREIGN PATENT DOCUMENTS

DE    102021103021 A1    9/2021
EP    2774828 A2 *    9/2014    .......... B62D 15/027
(Continued)

OTHER PUBLICATIONS

He International Search Report and the Written Opinion of the International Searching Authority mailed on May 31, 2022 for the counterpart PCT Application No. PCT/US2022/070172.

*Primary Examiner* — Kevin R Steckbauer

(57) ABSTRACT

A method, system and software product for maneuvering a vehicle-trailer unit in reverse travel with a trailer backing system is disclosed. The vehicle has a trailer hitch and a trailer is coupled to the trailer hitch thereby allowing a horizontal swivel movement of the trailer around the hitch. The trailer backing system includes an electronics control unit (ECU) and an input device communicatively coupled thereto. The method includes receiving, at the ECU, a selection of a trailer maneuver from a plurality of defined trailer maneuvers; and configuring the input device based upon the selected trailer maneuver, the input device being operable with the ECU to operate the vehicle for performing the trailer maneuver selected.

18 Claims, 6 Drawing Sheets

(51) Int. Cl.

| | | |
|---|---|---|
| *B60W 50/10* | (2012.01) | |
| *B60W 50/14* | (2020.01) | |
| *B62D 13/06* | (2006.01) | |
| *B62D 15/02* | (2006.01) | |

(52) U.S. Cl.

CPC ......... *B62D 13/06* (2013.01); *B62D 15/0285* (2013.01); *B60W 2050/146* (2013.01)

(56) References Cited

U.S. PATENT DOCUMENTS

| | | | |
|---|---|---|---|
| 9,783,230 B2 | 10/2017 | Hafner | |
| 9,836,060 B2 | 12/2017 | Ghneim | |
| 9,926,008 B2 * | 3/2018 | Hafner | .................. B62D 13/06 |
| 9,969,428 B2 * | 5/2018 | Hafner | .................. H04N 7/183 |
| 10,899,385 B2 * | 1/2021 | Gali | .................... B62D 15/028 |
| 10,906,583 B2 | 2/2021 | Li et al. | |
| 11,370,490 B2 * | 6/2022 | Sypitkowski | ........ B62D 15/028 |
| 2015/0094945 A1 * | 4/2015 | Cheng | ................ B60K 31/0066 |
| | | | 701/408 |
| 2015/0134183 A1 * | 5/2015 | Lavoie | .................. B62D 13/06 |
| | | | 701/41 |
| 2015/0158527 A1 * | 6/2015 | Hafner | .................. B60D 1/245 |
| | | | 701/41 |
| 2015/0203156 A1 * | 7/2015 | Hafner | .................. G08G 1/143 |
| | | | 701/36 |
| 2019/0100245 A1 * | 4/2019 | Fukushima | ........ B60W 50/085 |
| 2020/0353969 A1 * | 11/2020 | Sypitkowski | .......... B62D 13/06 |
| 2021/0284240 A1 | 9/2021 | Goodarzi et al. | |
| 2024/0067268 A1 * | 2/2024 | Herzog | ............. B62D 15/0285 |

FOREIGN PATENT DOCUMENTS

| | | | | |
|---|---|---|---|---|
| EP | 2774828 B1 * | 9/2016 | ............. | B62D 13/06 |
| WO | WO-2019052773 A1 * | 3/2019 | ........... | B62D 15/027 |
| WO | WO-2022155657 A1 * | 7/2022 | ......... | B62D 15/0285 |

* cited by examiner

ADAPTIVE KNOB CONTROL BASED UPON TRAILER MANEUVER TYPES

CROSS REFERENCE TO RELATED APPLICATIONS

The present application is a National Stage Application under 35 U.S.C. § 371 of International Patent Application No. PCT/US2022/070172 filed on Jan. 13, 2022, and claims priority from U.S. Provisional Patent Application No. 63/199,632 filed on Jan. 13, 2021, in the United States Patent Office, the disclosures of which are herein incorporated by reference in their entireties.

TECHNICAL FIELD

The present invention is related to a method, system and electronic processing device for maneuvering a vehicle and a connected trailer when the vehicle-trailer unit is in the process of backing up.

BACKGROUND

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path, for example when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

Input devices, such as a knob, have been used to address the difficulties in performing a backing operation in a vehicle having a connected trailer. The manual manipulation of the input devices typically replace the use of the vehicle's steering wheel for controlling the steering angle of the vehicle's front wheels. However, use of such input devices often have limitations in controlling the steering angle of the front wheels.

The background description provided herein is for the purpose of generally presenting the context of the disclosure.

SUMMARY

Example embodiments described herein include a method of maneuvering a vehicle-trailer unit in reverse travel with a trailer backing system. The vehicle has a trailer hitch and a trailer is coupled to the trailer hitch thereby allowing a horizontal swivel movement of the trailer around the hitch. The trailer backing system includes an electronics control unit (ECU) and an input device communicatively coupled thereto. The method includes receiving, at the ECU, a selection of a trailer maneuver from a plurality of defined trailer maneuvers. The input device is configured based upon the selected trailer maneuver. The input device is operable with the ECU to operate the vehicle for performing the trailer maneuver selected.

The input device includes a knob that is rotatable, and configuring the input device includes adjusting a maximum rotation of the knob to correspond to a maximum trailer hitch angle between the vehicle and the trailer.

The plurality of defined trailer maneuvers include a first trailer maneuver in which the vehicle is operated in a generally straight path, and a second trailer maneuver in which the vehicle is operated in a path that includes at least one turn in which a maximum trailer hitch angle between the vehicle and the trailer is greater than the maximum trailer hitch angle corresponding to the first trailer maneuver.

The defined trailer maneuvers may further include a third trailer maneuver in which the maximum trailer hitch angle requested by a driver of the vehicle exceeds the maximum trailer hitch angle corresponding to the second trailer maneuver. In one implementation, an increase of the maximum trailer hitch angle for the third trailer maneuver is requested at a faster rate the further the rotation of the knob is from a knob position corresponding to a zero degree trailer hitch angle. In another implementation, an increase of the maximum trailer hitch angle for the third trailer maneuver is requested by holding the knob at a maximum position for a period of time, and the amount of the maximum trailer hitch angle increase requested is based upon the period of time.

The method may further include defining a new trailer maneuver by receiving, via a user interface of the vehicle, one or more user-provided selections defining the new trailer maneuver as a sequence of trailer maneuver segments. At least one user-provided parameter is received via the user interface for each trailer maneuver segment of the new trailer maneuver. The defined new trailer maneuver is stored in memory along with the at least one user-provided parameter for each trailer maneuver segment as one of the plurality of defined trailer maneuvers, for subsequent selection.

The method may further include sending, by the ECU to a user interface of the vehicle, at least one instruction to display existing and new trailer maneuvers on a display of the user interface. In addition, a user selection of the new trailer maneuver is received by the ECU to be performed. Configuring the input device includes, for each trailer maneuver segment of the user-selected new trailer maneuver, configuring the input device based on the trailer maneuver segment being performed.

The selected trailer maneuver may include a sequence of a plurality of trailer maneuver segments. In this case, configuring the input device includes configuring, for each trailer maneuver segment, the input device based on the trailer maneuver segment being performed.

In one implementation, the input device includes a knob that is rotatable. Configuring the input device includes adjusting a maximum rotation of the knob to correspond to a maximum trailer hitch angle between the vehicle and the trailer. An increase of the maximum trailer hitch angle for the second trailer maneuver is requested by holding the knob at a maximum position for a period of time. An amount of the maximum trailer hitch angle increase requested is based upon the period of time.

Another example embodiment is directed to a trailer backing software program product for controlling an operation of a vehicle and a connected trailer in a reverse direction. The trailer backing software program product includes program instructions stored in non-transitory memory which, when executed by a processor circuit of an electronics control unit (ECU), causes the ECU to perform operations forming the methods described above.

Still another example embodiment is directed to a trailer backing system A for controlling an operation of a vehicle and connected trailer in a reverse direction. The trailer backing system includes an electronics control unit which is configured to perform the methods described above.

BRIEF DESCRIPTION OF THE DRAWINGS

The present disclosure will become more fully understood from the detailed description and the accompanying drawings, wherein.

DETAILED DESCRIPTION

Figure 1:
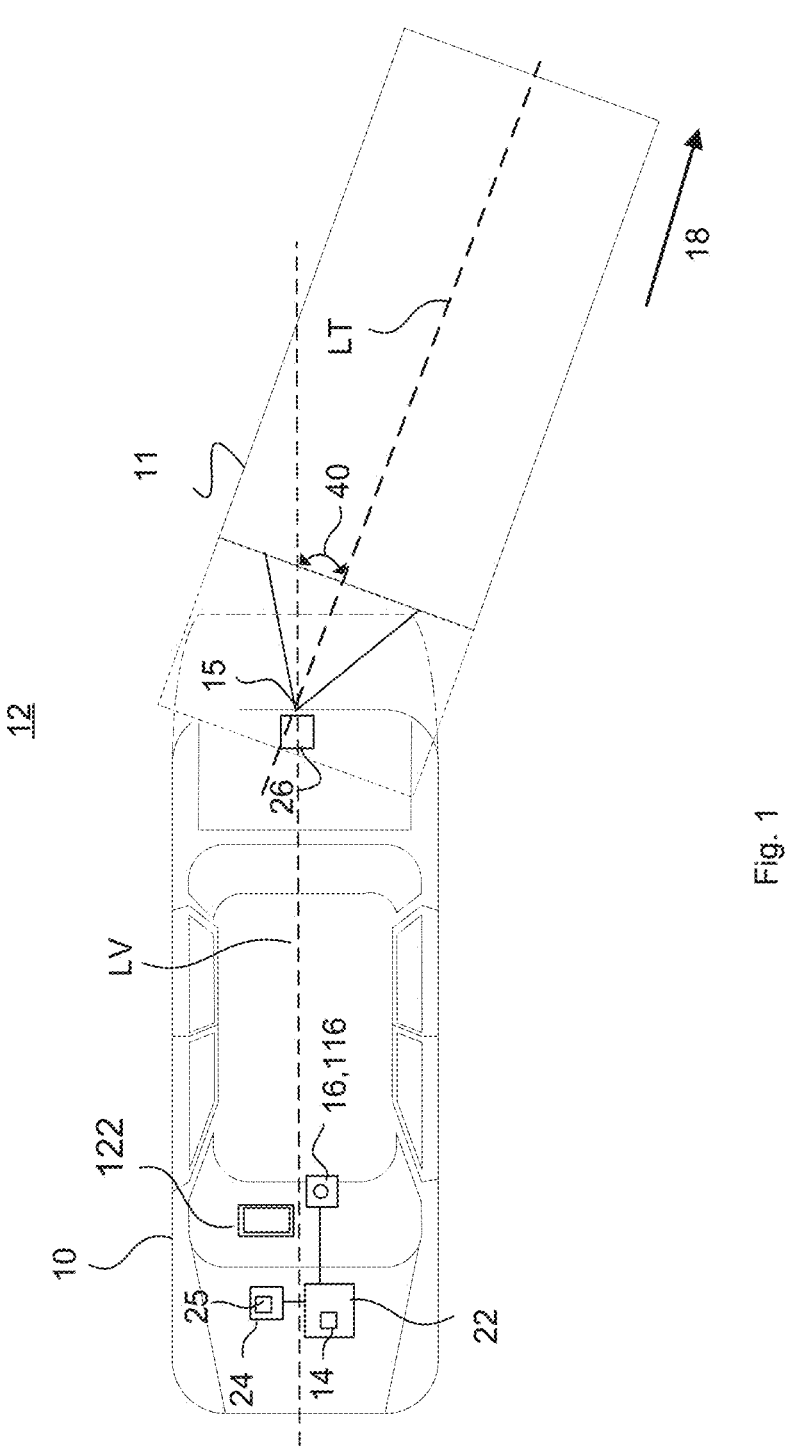
FIG. 1 is a schematic diagram of one example embodiment of a vehicle-trailer unit having a trailer backing system.

The following description is merely exemplary in nature and is in no way intended to limit the disclosure, its application, or uses. For purposes of clarity, the same reference numbers will be used in the drawings to identify similar elements.

Figure 2:
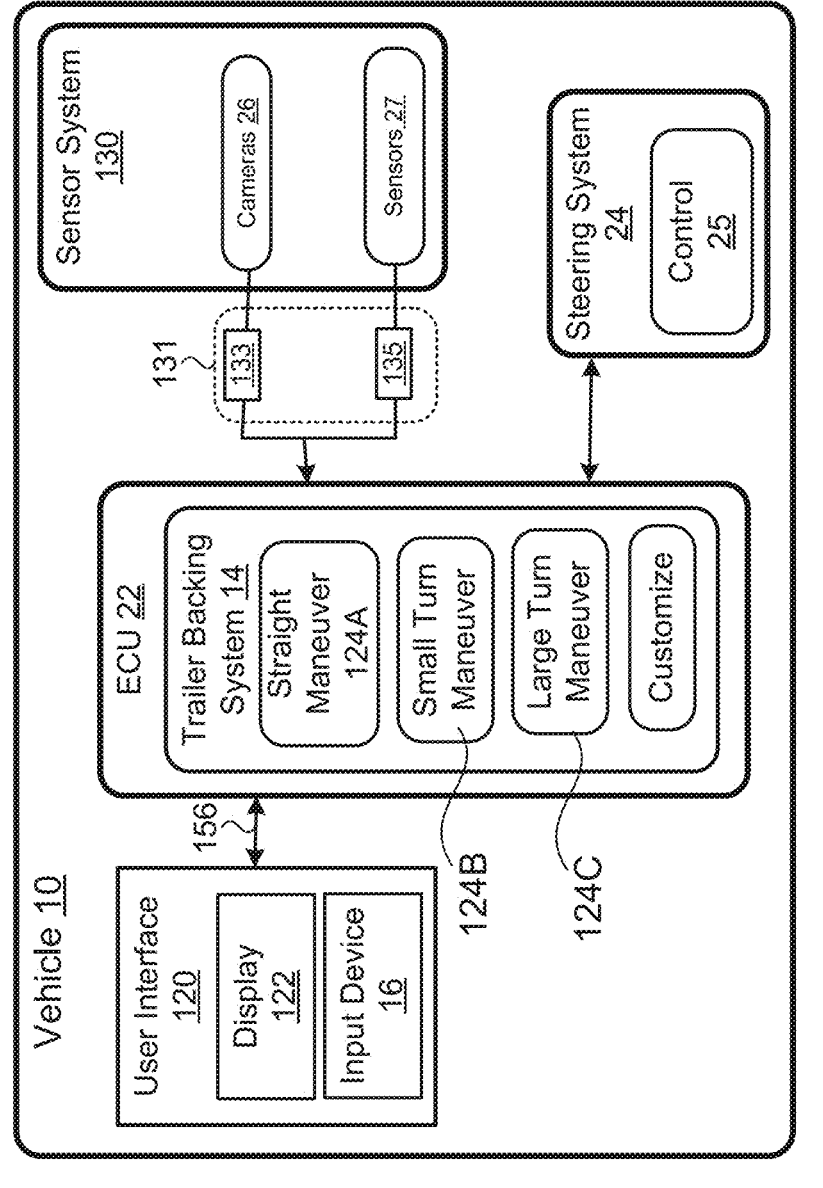
FIG. 2 is a block diagram of a vehicle having a trailer backing system according to an example embodiment.

FIGS. 1 and 2 illustrate a vehicle 10 and a trailer 11 according to one or more example embodiments. The trailer 11 is controllably secured to the vehicle 10 to form a vehicle-trailer unit 12. The trailer 11 may couple to a trailer hitch ball mounted along the bumper of the vehicle 10 as the trailer is shown in solid lines, or coupled to a gooseneck or fifth wheel hitch of the vehicle 10 as the trailer is shown in both dashed and solid lines. The vehicle-trailer unit 12 utilizes a trailer backing system 14 of the example embodiments. The trailer backing system 14 is located in or on the vehicle 10, as shown in FIGS. 1 and 2. Throughout the application, the relative directions of forward and reverse are in reference to the direction which an operator for the vehicle 10 would typically be facing when operating the vehicle 10 in a drive gear on a public road. Therefore, in operation of the trailer backing system 14 the vehicle 10 would be in a reverse gear and the operator may be facing backward to the reverse direction 18. The trailer backing system 14 provides the vehicle operator with a method of electronically defining a backing maneuver of the trailer 11. The trailer backing system 14 utilizes these maneuvers, hereinafter "trailer maneuvers", t to control movement of vehicle-trailer unit 12 in the reverse direction 18.

Referring to FIGS. 1-6, the arrangement and methods for utilizing the trailer backing system 14 are described. The trailer 11 is connected to the vehicle 10 through a trailer hitch 15, which allows the trailer to swivel horizontally around the vertical axis of the trailer hitch 15, which is the axis vertical to the drawing plane. The trailer backing system 14 includes an electronic control unit ("ECU") 22. The ECU 22 may be connected to at least one vehicle system 24 such as a steering system 24. The steering system 24, which may be an active power steering system, is configured to receive inputs regarding the turning of at least one wheel of the vehicle and to actuate movement of the at least one wheel in accordance with the received inputs. Other vehicle systems (not shown), such as powertrain and/or a brake systems to control and direct movement of the vehicle-trailer unit 12 may also be connected to the ECU 22. The ECU 22 may be a controller or microcontroller and include one or more core processors/processing circuits as well as volatile and/or non-volatile memory which store software program code having instructions which, when executed by the processors/processing circuits, cause the ECU 22 to control the trailer backing system 14 and the at least one vehicle system 24 for operating the vehicle 10 and trailer 11 in forward or reverse directions.

The ECU 22 communicates with a control module 25 for the steering system 24. The control module 25 is an electronic processing unit controlling the steering system 24 that is capable of actively changing a steering angle of front axle wheels without the vehicle driver giving input through the vehicle steering wheel. The steering system 24 may also include the capability of additionally steering the rear axle wheels. The control module 25 computes corrective actions to be taken in order to maneuver the vehicle 10 and initiates the steering system 24 accordingly. Thus, the ECU 22 sends instructions to the steering system 24 to move the vehicle-trailer unit 12 based upon the input from the ECU 22.

The vehicle 10 further includes a sensor system 130 and a user interface 120. The sensor system 130 may include at least one sensor disposed on the vehicle 10. The user interface 120 may include, among other things, an input device 16. A sensor 26 and the input device 16 are connected to the ECU 22. The input device 16 and the sensor 26 may already be existing and incorporated into the vehicle 10. The input device 16 may be one of a joystick, a roller ball, a knob, a slide device, at least one physical button, at least one touch screen button, a handheld electronic device, gesture control inputs or voice control inputs. For example, the input device 16 may be a knob style input device that is used with a navigation/information system, or a separate portable device that may be removed from the vehicle 10 and connected wirelessly to the ECU 22. Alternatively, the input device 16 may be a hand-held device where inputting a requested hitch angle includes pivoting the hand-held display toward the desired direction of travel and the electronic control unit determines an angle of the hand-held device relative to horizontal based upon input from a gyroscope within the hand-held device.

The sensor 26 may be used to measure the hitch angle 40 formed between a longitudinal axis LV of the vehicle 10 and a longitudinal axis LT of the trailer 11. The sensor 26 may be one or multiple sensors measuring relative distance between the vehicle 10 and the trailer 11 and using the varied distance to calculate hitch angle 40. The sensor 26 may use horizontal or vertical features on the trailer 11 in the distance measurement.

In one embodiment, the sensor 26 is a camera, preferably a camera which is installed in or on the vehicle 10, such as a back-up camera disposed along the rear portion of the vehicle 10 and facing in the rear direction. The camera 26 may capture an image and image analysis may be used to calculate the hitch angle 40. A distinct marking can be established on the trailer 11 and captured by the camera for analysis. For example, the marking may be three or more of dots spaced apart from one another and positioned on the front of the trailer 11 proximate to the hitch 15. The camera 26 may capture an image of the marking and the ECU 22 may analyze the image to determine the relative position of the dots to one another. The ECU 22 compares the relative distances of the dots and to stored data of the relative distances. The stored data would include at what hitch angle 40 those relative distances would occur. Thus, the hitch angle 40 can be calculated using the camera 26 of the sensor system 130 and a predetermined distinct marking. The marking may be specific to the trailer backing system 14, e.g., a known decal to be applied to the trailer 11, since the relative distances of the markings may be prerecorded by the ECU 22. The distance to the marking from the camera 26 may also need to be input into the system 14.

In another embodiment, the trailer backing system 14 can use reference points on the trailer 11 as markings, such as the corners of the trailer, hitch attachment point, body decals that are provided by the manufacturer, etc. to determine the hitch angle 40. The ECU 22 may employ a learning mode to learn the relative distances at known hitch angles 40 the first time the system 14 is used. The trailer backing system 14 could learn the relative distances between the markings when the trailer 11 is hitched to the vehicle 10 and at a known angle, e.g., zero degrees hitch angle.

It is understood that the sensor system 130 may also include side cameras (not shown) disposed along the two sides of the vehicle 10, such as on the side mirror assemblies of the tow vehicle. The trailer backing system 14 may generate images, such as images from the camera 26 and optionally the side cameras, which correspond to an environment to the rear of the vehicle 10 for use in maneuvering the vehicle 10 and the connected trailer 11 in the reverse direction. The sensor system 130 may further include one or more sensors 27, such as radar, LIDAR, LADAR and/or ultrasonic cameras for use in identifying the environment surrounding the vehicle and, when used in conjunction with the trailer backing system 14, for facilitating the maneuvering of the vehicle 10 and trailer 11 in the reverse direction. Sensor (image) data 133 from the camera 26 and sensor data 135 from the sensor(s) 27, herein collectively "sensor data" are provided to the ECU 22.

Figure 4A:
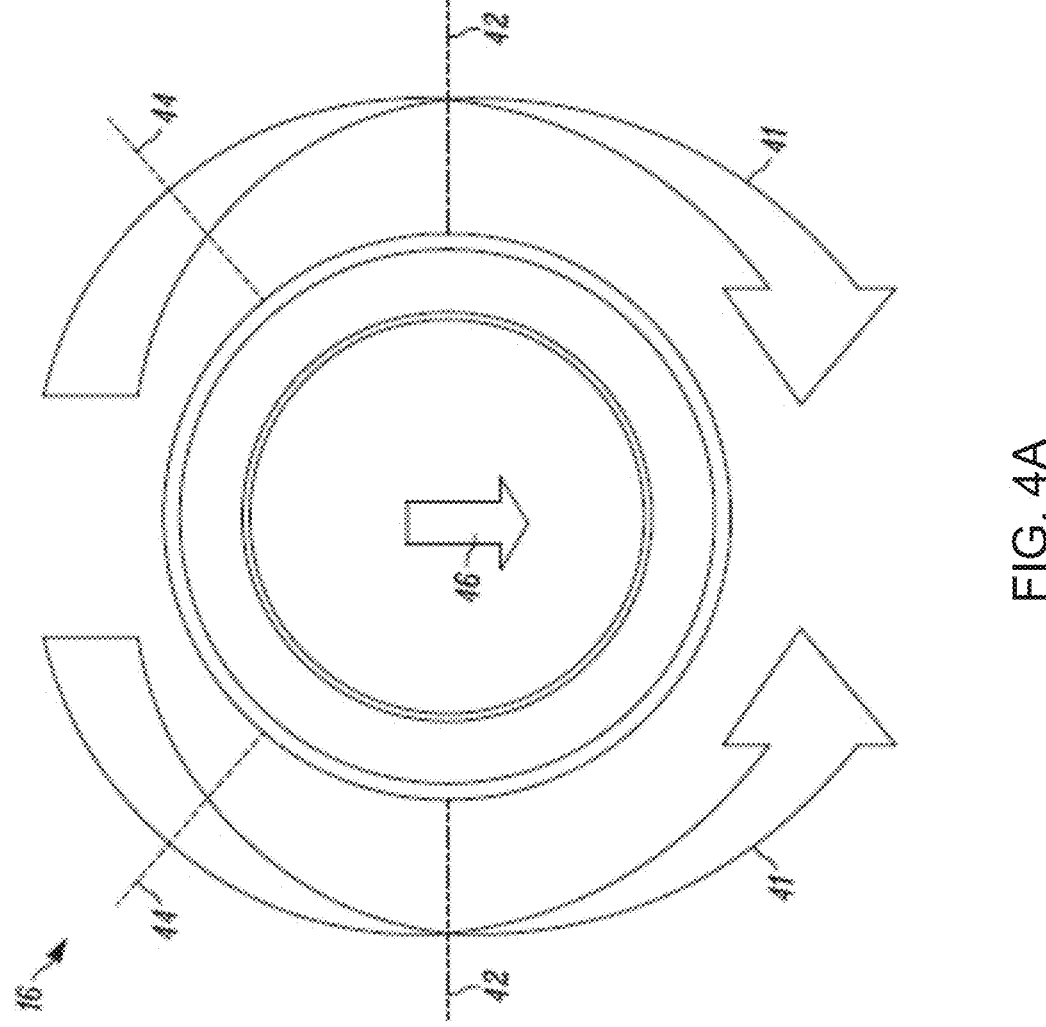
FIG. 4A is a schematic illustration of a knob style input device according to one example embodiment for controlling a trailer backup operation according to an example embodiment.
Figure 4B:
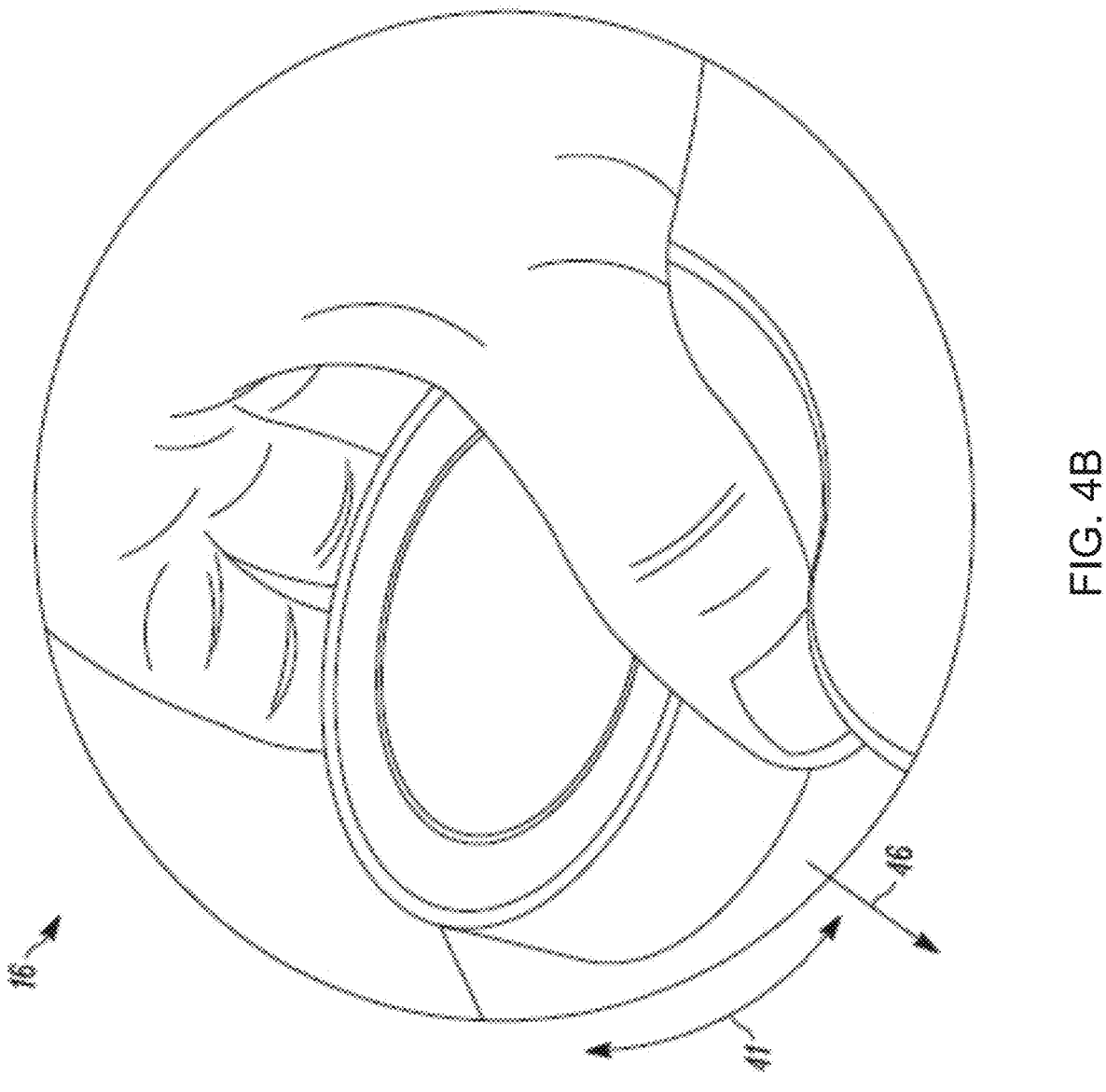
FIG. 4B is a perspective view of a knob style input device of FIG. 3A undergoing manual manipulation.

FIGS. 4A and 4B illustrate the input device 16, where the device is a knob style input device according to one implementation. The ECU 22 receives control signals from the knob style input device 16 (hereinafter "the knob 16") based on rotational movement of the knob 16 to the right and left and interprets the movement to begin a steering request for transmission to the control module 25 of the steering system 24 for controlling the steering angle of the front wheels of the vehicle 10 in the direction chosen. The knob 16 has an available range of motion 41.

FIG. 2 illustrates the input device 16 (i.e., the knob 16 in the illustrated example embodiments) as part of the user interface 120. The user interface 120 may also include a display 122 in addition to the input device 16. The display 122 may be a touch screen display. In some examples, the display 122 may show the input device 16, while in other examples, the input device 16 may be separate from the display 22, as shown in the drawings. In some examples, user interface 120 receives one or more driver commands from the driver or other user of the vehicle 10 via one or more input mechanisms/devices and/or the touch screen display 122, and/or displays one or more notifications to the vehicle driver. The user interface 120 is in communication with the ECU 22.

In general terms, the trailer backing system 14 allows for a user selection of the behavior of the input device 16 and with it the relationship to a corresponding trailer angle 40 of the trailer 11 relative to the vehicle 10. The behavior of the input device 16 is based upon the selection. In an example embodiment, the trailer backing system 14 provides a plurality of different trailer maneuvers 124, any one of which is selectable by the driver/user of the vehicle 10. The trailer backing system 14 configures the input device 16 based upon the trailer maneuver 124 selected. Each trailer maneuver 124 may configure the knob 16 differently from the other trailer maneuvers 124.

Figure 3:
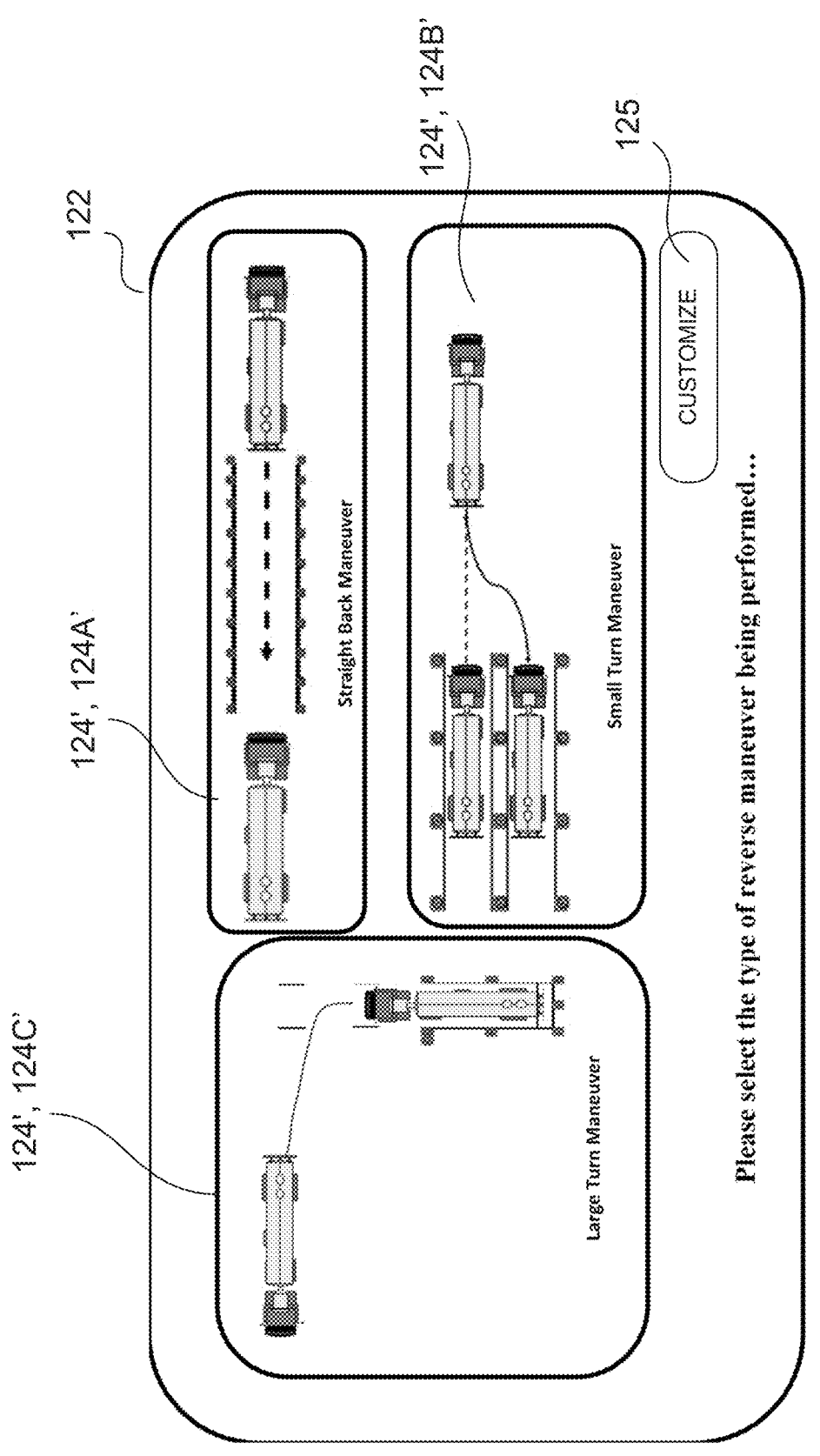
FIG. 3 is a display presented to an operator of the vehicle-trailer unit according to an example embodiment.

In an example embodiment, the different trailer maneuvers 124 may be presented to the driver of vehicle 10 on the display 122 for selection. FIG. 3 illustrates the display 122 showing three trailer maneuvers 124. Each trailer maneuver 124 may be depicted in the display 122 as an icon 124' which generally indicates the type of trailer maneuver. Though icons 124' corresponding to the three trailer maneuvers 124 are depicted, the number of different trailer maneuvers 124 for selection may vary.

Each trailer maneuver 124 provides a unique configuration for the operation of the knob 16 in controlling the vehicle 10 and the connected trailer 11. In the example embodiment shown in FIG. 3, a first trailer maneuver 124A configures the knob 16 for performing a "straight back" maneuver in which the vehicle 10 and the trailer 11 are operated in reverse without or nearly without executing a turn. In this trailer maneuver 124A, the operation of the knob 16 is configured by the ECU 22 so that maximum rotation of the knob 16 results in a relatively small steering angle of the front wheels of the vehicle 10 and thus a relatively small trailer hitch angle 40, such as between 5 degrees and 15 degrees, and particularly 10 degrees. When the trailer maneuver 124A is selected, the knob 16 is configured so as to better accommodate operating the vehicle 10 and the trailer 11 in reverse with only minimal hitch angle (i.e., when the trailer 11 is aligned with the vehicle 10) so that their longitudinal axes are parallel to or colinear with each other.

A second trailer maneuver 124B configures the knob 16 for performing a "small turn" maneuver in which the vehicle 10 and the trailer 11 are operated in reverse while performing one or more smaller angle turns. In this trailer maneuver 124B, the operation of the knob 16 is configured by the ECU 22 so that maximum rotation of the knob 16 results in a relatively larger or "medium" steering angle of the front wheels of the vehicle 10 and thus a medium trailer hitch angle, such as between 40 and 60 degrees and particularly 50 degrees. When the trailer maneuver 124B is selected, the knob 16 is configured so as to better accommodate operating the vehicle 10 and the trailer 11 in reverse with relatively modest turns.

A third trailer maneuver 124C configures the knob 16 for performing one or more relatively large turns. In this trailer maneuver 124C, the operation of the knob 16 is configured by the ECU 22 so that maximum rotation of the knob 16 results in a larger steering angle of the front wheels of the vehicle 10 than the medium steering angle and thus a trailer hitch angle which may exceed the maximum hitch angle in the second trailer maneuver 124B. The particular hitch angle corresponding to the maximum rotation of the knob 16 may vary depending upon the driver's manipulation of the knob

16. This third trailer maneuver 124C may be selected by a driver of a vehicle 10 coupled to a gooseneck or fifth wheel trailer, for example.

In a first implementation of the third trailer maneuver 124C, rotation of the knob 16 provides a request to increase the trailer angle in a direction of knob rotation and at a faster rate the further the rotation of the knob 16 is from its position corresponding to zero degrees of rotation. In this way, the amount of change of the requested trailer hitch angle varies depending upon the position of the knob relative to its zero degree position. With the requested trailer hitch angle changing at a faster rate the further the knob 16 is from its zero degree position, a driver has enhanced ability to request a trailer hitch angle increase in a reverse operation of the vehicle 10.

In a second implementation of the third trailer maneuver 124C, the trailer hitch angle requested is adapted to be a higher value when the knob 16 is fully rotated. For example, holding the knob 16 at a position, such as the position corresponding to the previously-set maximum trailer hitch angle, causes the trailer hitch angle requested to increase. The amount of the trailer hitch angle increase that is requested may increase the longer the period of time the knob 16 is held at such position.

The trailer backing system 14 may also allow for customization of trailer maneuvers 124. This may be helpful, for example, when a specific and regularly occurring trailer maneuver is required which is not as effectively performed under any of the previously defined trailer maneuvers 124. In one implementation, a new trailer maneuver may be defined by the vehicle user manually adjusting the maximum trailer hitch angle 40 to a value that is different from the maximum trailer hitch angle provided in the trailer maneuvers 124A-124C. In this implementation, the ECU 22 receives the user instruction from the vehicle user via the user interface to adjust the maximum trailer hitch angle allowed for trailer maneuvers 124A-124C. With the maximum trailer hitch angle 40 adjusted to a new value for a customized trailer maneuver, the operation of the knob 16 is configured by the ECU 22 accordingly so that maximum rotation of the knob 16 results in the maximum trailer hitch angle 40 being reached.

In another implementation of the trailer maneuver customization feature, a new trailer maneuver may be defined by sequential trailer maneuver segments, each of which may have a different configuration of the knob 16 and/or a different maximum trailer hitch angle 40. For example, a user/driver may define a new trailer maneuver by a "straight back" maneuver segment, such as corresponding to the trailer maneuver 124A, for a first defined distance, followed by a large left turn maneuver segment, such as corresponding to the trailer maneuver 124C, for a second defined distance which is then followed by a small right turn maneuver segment, such as corresponding to the trailer maneuver 124B, for a third defined distance. The new trailer maneuvers and their corresponding parameters (e.g., defined distance, maximum trailer angle 40, etc.) are defined by the vehicle user using the user interface 120.

Figures 5, 6:
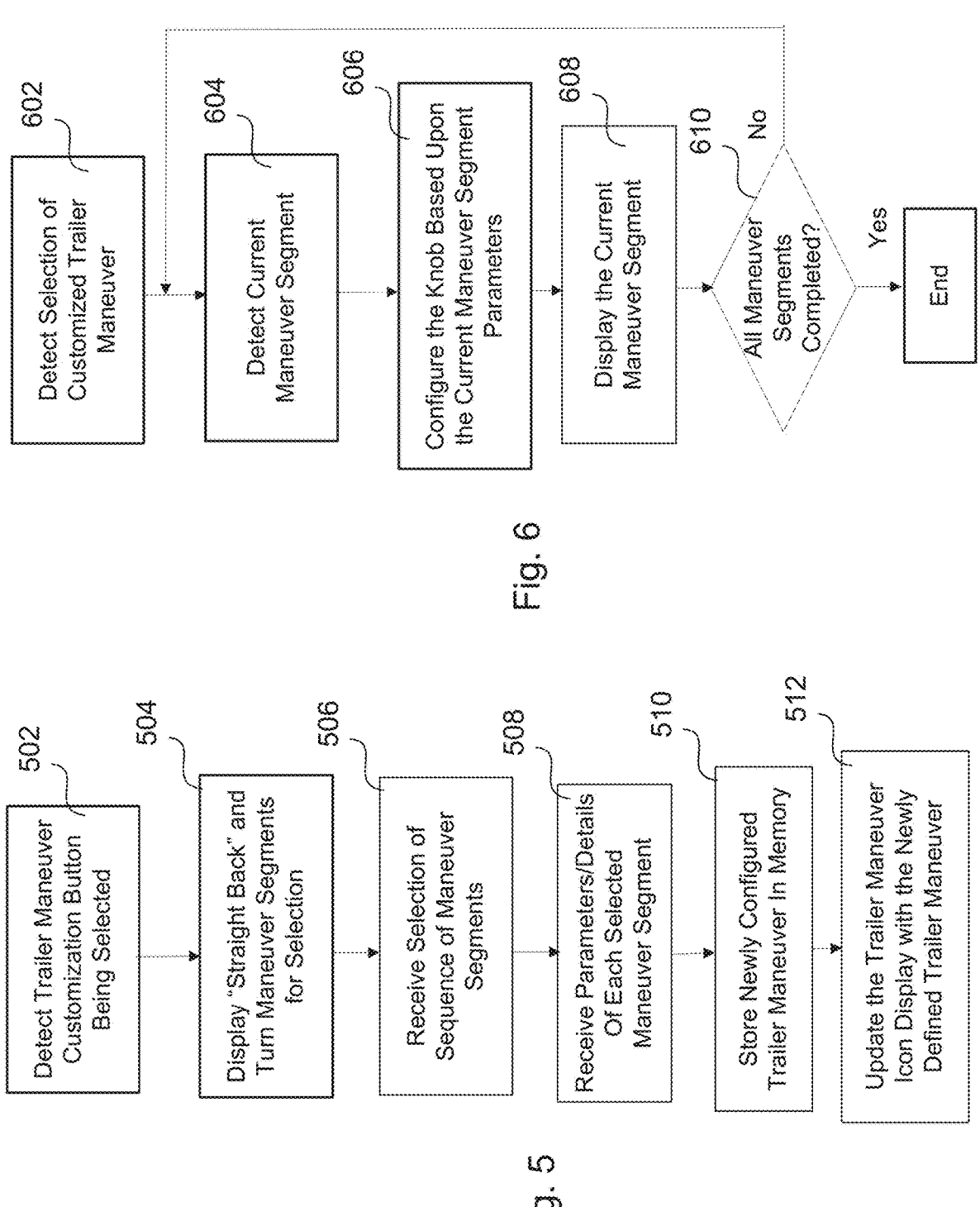
FIG. 5 is a flowchart illustrating a customization trailer maneuver feature of the trailer backing system according to an example embodiment.
FIG. 6 is a flowchart illustrating an operation of a customized trailer maneuver feature of the trailer backing system according to an example embodiment.

FIG. 6 illustrates a flow chart depicting the operation of a customized trailer maneuver according to an example embodiment. In this case, the trailer maneuver 124 selected is a maneuver having a plurality of sequential trailer maneuver segments. Upon detecting or receiving at 602 by the ECU 22 the driver selection of a customized trailer maneuver displayed on the display 122, the trailer backing system 14 determines at 604 which trailer maneuver segment is currently being undertaken and configures the knob 16 and/or its sensitivity accordingly at 606. The ECU 22 may detect transitions between maneuver segments, for example, by the driver letting go and/or otherwise no longer manipulating the knob 16, by the driver manipulating the knob 16 in a certain way (e.g., pressing in the downward direction 46 on the knob so that a knob sensor detects the downward movement thereof), or by the trailer backing system 14 tracking the distances travelled by the vehicle 10 based upon the defined distances for each trailer maneuver segment. During execution of the selected custom trailer maneuver, the user interface of the trailer backing system 14 may, responsive to instructions from the ECU 22, indicate on the display 122 at 608 the current maneuver segment that is currently being undertaken so that the driver is aware of the current configuration and/or sensitivity of the knob 16. When the ECU 22 determines at 610 that all of the trailer maneuver segments have been performed, the ECU 22 ends the selected customized trailer maneuver.

In one implementation, the user interface of the trailer backing system 14 includes a customize "button" 125 on the display 122 (see FIG. 3) which when touched or otherwise selected allows for a vehicle user to define or customize a new trailer maneuver. For example, and referring to FIG. 5, the ECU 22 may detect at 502 the customize button 125 on the display 122 being selected, indicating the start of a new, custom trailer maneuver 124 to be defined. In response to the detection of the customize button selection, the ECU 22 displays at 504 icon representations 124' of the existing trailer maneuvers 124, any of which may be used in defining at least one trailer maneuver segment of the new trailer maneuver being created or defined by the vehicle user. The ECU 22 receives at 506 user sequential user selections of the trailer maneuvers 124 each of which defines the trailer maneuver segments. In this example, the user interface 120 allow for each trailer maneuver segment to be defined as a "straight back" maneuver segment or a turn maneuver segment. The ECU 22, via the user interface 120, allows, for each selected trailer maneuver segment in the sequence, for the selection of a distance to be travelled under the trailer maneuver segment, at 508. For turn maneuver segments selected in the sequence, each segment may be defined as a left or right turn as well as a maximum trailer hitch angle (and/or small or large turn, for example). It is understood that other parameters of the trailer maneuver segment may be provided by the user via the user interface 120. Once each trailer maneuver segment is defined, the newly defined trailer maneuver 124 is stored at 510 in the memory that forms part of or is otherwise associated with the ECU 22 and is subsequently available for selection. For example, an icon 124 similar to the icons 124A'-124C' for the trailer maneuvers 124A-124C, respectively, corresponding to the newly defined trailer maneuver may be included at 512 on the display 122 as shown in FIG. 2 for selection by the driver of the vehicle 10.

While the figures show the ECU 22 separate from the control module 25 and from the power steering system 24, these modules can be integrated into processing units cooperating to perform the described functions. The ECU 22 and/or the trailer backing system 14 can, therefore, be an after-market add-on.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of maneuvering a vehicle-trailer unit in reverse travel with a trailer backing system, wherein a vehicle has a trailer hitch and a trailer is coupled to the trailer hitch thereby allowing a horizontal swivel movement of the trailer around the hitch, and wherein the trailer backing system includes an electronic control unit (ECU) and an input device communicatively coupled thereto, the method comprising:

receiving, at the ECU, a selection of a trailer maneuver from a plurality of defined trailer maneuvers; and configuring the input device based upon the selected trailer maneuver, the input device being operable with the ECU to operate the vehicle for performing the trailer maneuver selected;

wherein the selected trailer maneuver comprises a sequence of a plurality of trailer maneuver segments, and configuring the input device comprises configuring, for each trailer maneuver segment, the input device based on the trailer maneuver segment being performed, wherein each segment has an associated user-provided parameter.

2. The method of claim 1, wherein the input device comprises a knob that is rotatable, and configuring the input device comprises adjusting a maximum rotation of the knob to correspond to a maximum trailer hitch angle between the vehicle and the trailer.

3. The method of claim 2, wherein the plurality of defined trailer maneuvers comprise a first trailer maneuver in which the vehicle is operated in a generally straight path, and a second trailer maneuver in which the vehicle is operated in a path that includes at least one turn in which a maximum trailer hitch angle between the vehicle and the trailer is greater than the maximum trailer hitch angle corresponding to the first trailer maneuver.

4. The method of claim 3, wherein the defined trailer maneuvers include a third trailer maneuver in which the maximum trailer hitch angle requested by a driver of the vehicle exceeds the maximum trailer hitch angle corresponding to the second trailer maneuver.

5. The method of claim 4, wherein an increase of the maximum trailer hitch angle for the third trailer maneuver is requested at a faster rate the further the rotation of the knob is from a knob position corresponding to a zero degree trailer hitch angle.

6. The method of claim 4, wherein an increase of the maximum trailer hitch angle for the third trailer maneuver is requested by holding the knob at a maximum position for a period of time, the amount of the maximum trailer hitch angle increase requested being based upon the period of time.

7. The method of claim 1, further comprising defining a new trailer maneuver by receiving, via a user interface of the vehicle, one or more user-provided selections defining the new trailer maneuver as a sequence of trailer maneuver segments;

receiving, via the user interface, at least one additional user-provided parameter for each trailer maneuver segment of the new trailer maneuver; and storing the defined new trailer maneuver along with the at least one additional user-provided parameter for each trailer maneuver segment as one of the plurality of defined trailer maneuvers, for subsequent selection.

8. The method of claim 7, further comprising:

sending, by the ECU to a user interface of the vehicle, at least one instruction to display existing and new trailer maneuvers on a display of the user interface; and receiving, by the ECU, a user selection of the new trailer maneuver to be performed, wherein configuring the input device comprises, for each trailer maneuver segment of the user-selected new trailer maneuver, configuring the input device based on the trailer maneuver segment being performed.

9. The method of claim 1, wherein the input device comprises a knob that is rotatable, configuring the input device comprises adjusting a maximum rotation of the knob to correspond to a maximum trailer hitch angle between the vehicle and the trailer, an increase of the maximum trailer hitch angle for a second trailer maneuver is requested by holding the knob at a maximum position for a period of time, and an amount of the maximum trailer hitch angle increase requested is based upon the period of time.

10. A trailer backing software program product for controlling an operation of a vehicle and a connected trailer in a reverse direction, the trailer backing software program product including program instructions stored in non-transitory memory which when executed by a processor circuit of an electronic control unit (ECU), causes the ECU to perform operations comprising:

receiving a selection of a trailer maneuver from a plurality of defined trailer maneuvers; and configuring an input device coupled to the ECU based upon the selected trailer maneuver, the input device being operable with the ECU to operate the vehicle for performing the trailer maneuver selected wherein the selected trailer maneuver comprises a sequence of a plurality of trailer maneuver segments, and configuring the input device comprises configuring, for each trailer maneuver segment, the input device based on the trailer maneuver segment being performed, wherein each segment has an associated user-provided parameter.

11. The trailer backing software program product of claim 10, wherein the input device comprises a knob that is rotatable, and configuring the input device comprises adjusting a maximum rotation of the knob to correspond to a maximum trailer hitch angle between the vehicle and the trailer.

12. The trailer backing software program product of claim 11, wherein the plurality of defined trailer maneuvers comprise a first trailer maneuver in which the vehicle is operated in a generally straight path, and a second trailer maneuver in which the vehicle is operated in a path that includes at least one turn in which a maximum trailer hitch angle between the vehicle and the trailer is greater than the maximum trailer hitch angle corresponding to the first trailer maneuver.

13. The trailer backing software program product of claim 12, wherein the defined trailer maneuvers include a third trailer maneuver in which the maximum trailer hitch angle requested by a driver of the vehicle exceeds the maximum trailer hitch angle corresponding to the second trailer maneuver.

14. The trailer backing software program product of claim 13, wherein an increase of the maximum trailer hitch angle for the third trailer maneuver is requested at a faster rate the further the rotation of the knob is from a knob position corresponding to a zero degree trailer hitch angle.

15. The trailer backing software program product of claim 13, wherein an increase of the maximum trailer hitch angle for the third trailer maneuver is requested by holding the knob at a maximum position for a period of time, the amount of the maximum trailer hitch angle increase requested being based upon the period of time.

16. The trailer backing software program product of claim 10, wherein the operations further comprise defining a new trailer maneuver by receiving, via a user interface of the vehicle, one or more user-provided selections defining the new trailer maneuver as a sequence of trailer maneuver segments;

receiving, via the user interface, at least one additional user-provided parameter for each trailer maneuver segment of the new trailer maneuver; and storing the defined new trailer maneuver along with the at least one additional user-provided parameter for each trailer maneuver segment as one of the plurality of defined trailer maneuvers, for subsequent selection.

17. The trailer backing software program product of claim 16, wherein the operations further comprise:

sending, to a user interface of the vehicle, at least one instruction to display existing and new trailer maneuvers on a display of the user interface; and receiving a user selection of the new trailer maneuver to be performed, wherein configuring the input device comprises, for each trailer maneuver segment of the user-selected new trailer maneuver, configuring the input device based on the trailer maneuver segment being performed.

18. The trailer backing software program product of claim 10, wherein the input device comprises a knob that is rotatable, configuring the input device comprises adjusting a maximum rotation of the knob to correspond to a maximum trailer hitch angle between the vehicle and the trailer, an increase of the maximum trailer hitch angle for a second trailer maneuver is requested by holding the knob at a maximum position for a period of time, and an amount of the maximum trailer hitch angle increase requested being based upon the period of time.

\* \* \* \* \*